May 2, 1933. N. STRAUSSLER 1,906,776
WHEEL OF ROAD VEHICLES
Filed Nov. 10, 1928  2 Sheets-Sheet 2
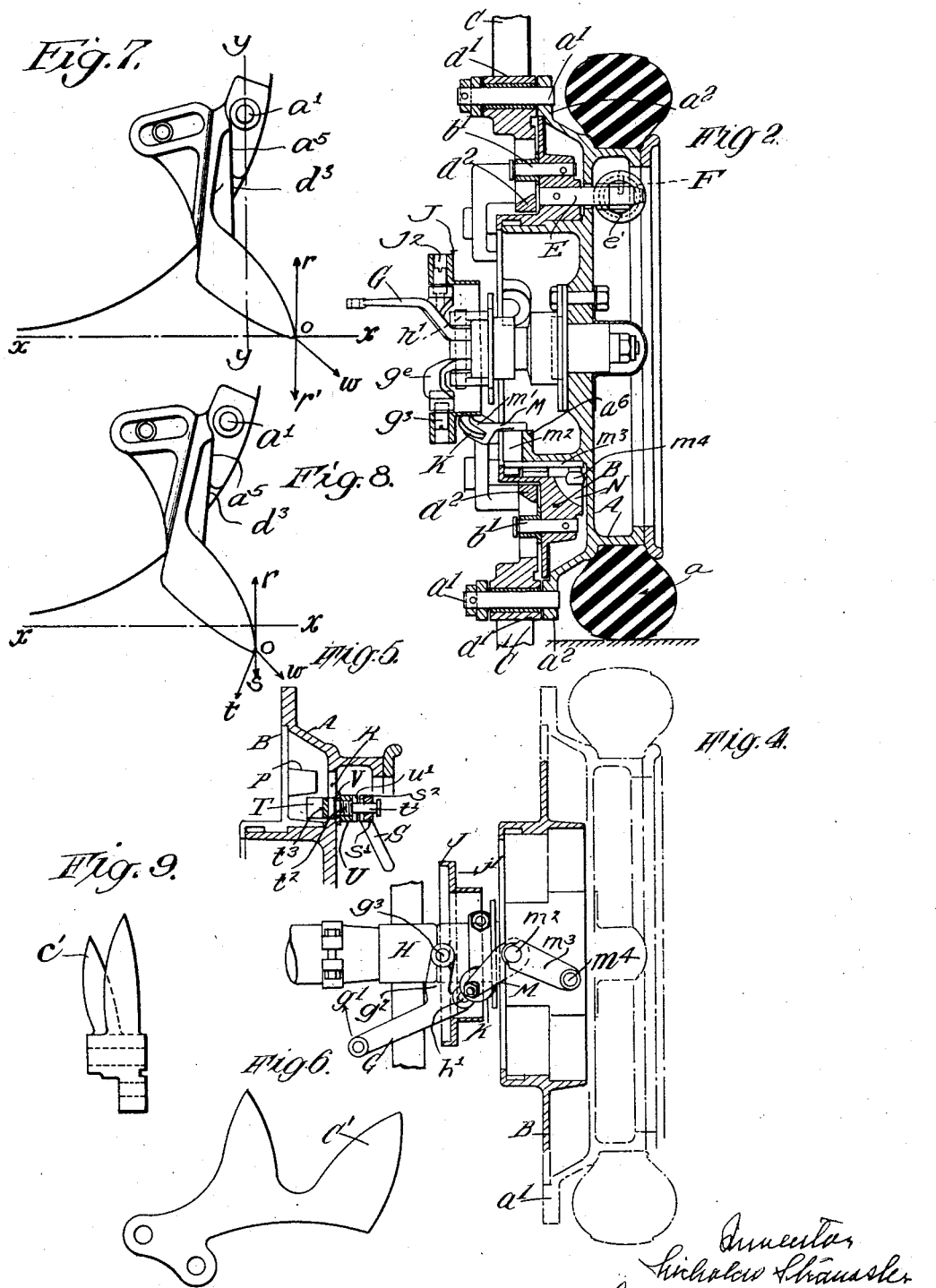

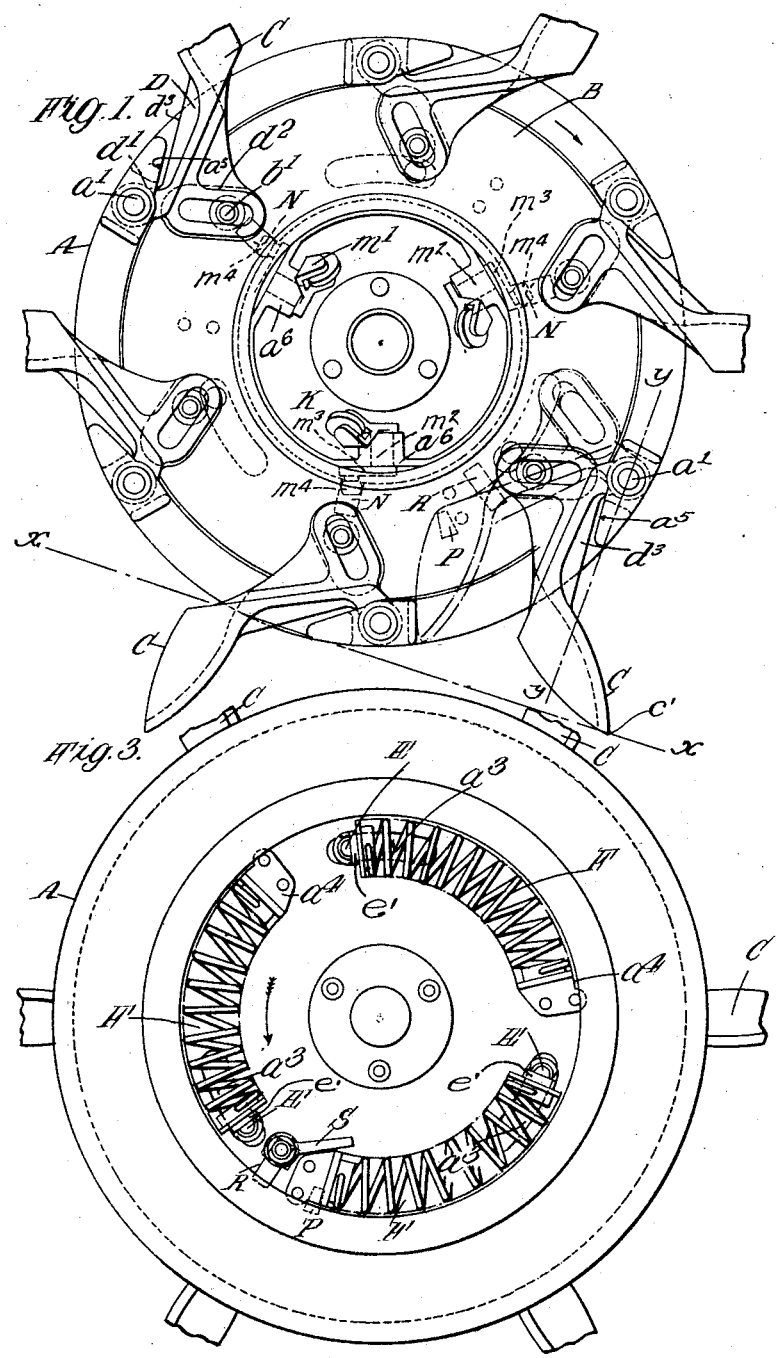

Patented May 2, 1933

1,906,776

UNITED STATES PATENT OFFICE

NICHOLAS STRAUSSLER, OF LONDON, ENGLAND, ASSIGNOR TO BENDIX AVIATION CORPORATION, A CORPORATION OF DELAWARE

WHEEL OF ROAD VEHICLES

Application filed November 10, 1928, Serial No. 318,480, and in Great Britain November 14, 1927.

This invention relates to wheels of road vehicles of the kind in which teeth or spikes, technically called "grousers" are caused to protrude beyond the periphery of the wheel when traveling on soft ground in order to obtain a driving grip on the ground, but when traveling on a hard surface the said teeth retire within the periphery of the wheel. In cases where such protusion has been effected and retraction permitted by springs acting in a radial direction relatively to the wheel, the said springs continually pass from an operative position to an inoperative position, and vice versa, so that they quickly wear out.

One of the objects of this invention is to produce in wheels having a number of spring-impelled teeth the same conditions in the springs as those which occur in the case of the leaf springs of vehicles, that is to say, when a loaded condition has been established, play of the springs is not required so long as the vehicle is traveling on a smooth road.

Another object is to provide a vehicle wheel having a plurality of spring-impelled, protruding teeth, or grousers, with which penetration may be achieved on fairly hard ground, and in which, at all times, the amount of penetration is automatically adjusted dependent upon the condition of the ground and the torque upon the wheel.

According to the invention a number of members or levers each carrying one or more teeth, spikes, or "grousers" are movably mounted or pivoted on a part of the wheel, and also on a ring or disc which is capable of rotary movement relatively to the wheel, and means are provided for moving the said ring or disc in such a direction that by the consequent movements of said members or levers all the teeth are protruded beyond the periphery of the wheel, or retracted, according to the direction of the said movement. Additional means may also be provided to operate and fix the position of the grousers positively and in any attitude irrespective of the action of the aforesaid means for protruding the grousers. The penetration of each grouser into the ground is governed by the relative locations of the pivot point on the wheel and the tip of the grouser, as will be explained in more detail in connection with the drawings.

In order that the said invention may be clearly understood and readily carried into effect, the same will now be described more fully with reference to the accompanying drawings, in which:—

Figure 1 represents in elevation the inner side of a wheel embodying this invention.

Figure 2 is a central vertical section thereof.

Figure 3 is an elevation of the outer side of the wheel.

Figure 4 is a plan of the control mechanism seen in Figure 2.

Figure 5 is a transverse section of the locking device seen in Figure 3.

Figure 6 illustrates a modification hereinafter mentioned.

Figure 7 is a force diagram showing the various forces which are exerted upon a grouser upon initial contact with the ground. Figure 8 is is a force diagram similar to Figure 7, but representing the forces acting after initial penetration of the ground by the grouser.

Figure 9 is an end view of the modified grouser shown in Figure 6.

A indicates the wheel having a tire $a$ of rubber or other suitable material which normally runs on the ground, B the control disc, and C, C the grousers, which are curved teeth, and each of which is formed integrally with a lever D. This lever D has two arms, namely a short arm $d'$ bored to rock freely on a pivot bolt $a'$ secured to a ring or flange extension $a^2$ on the wheel, and a long arm $d^2$ which in this example is slotted to embrace a pin $b'$ secured in the control disc B, although it will be understood that any suitable equivalent structure may be substituted for the pin and slot connection herein shown. Pins E are secured at one end to the control disc B and extend freely through slots $a^3$ in the wheel A (Figure 3), having secured at their outer ends bracket like members $e'$ which serve not only to connect one end of each of a plurality of coiled springs F to pins E but also to hold disc B in cooperative relation with wheel A. Furthermore, as is clear from Figure 2, arms $d^2$ of the grousers, the latter being secured to rim $a^2$ of wheel A, also serve to maintain control disc B in its proper position. The other ends of coiled springs F are secured to lugs $a^4$ bolted to the wheel, these springs tending to cause an angular movement of the pins E and the disc B in the direction of the arrow seen in Figure 3 to the extent permitted by the slots $a^3$. Outward movement of grousers C is not only limited by the co-operative action of pins E and slots $a^3$, but also by the provision of positive stops $a^5$, secured to flange $a^2$ of the wheel, and against which a flat side $d^3$ of lever D is adapted to abut. This angular movement of the disc B relatively to the wheel A causes all the grousers C to be projected into the positions seen in Figure 2 and in full lines in Figure 1, but a reverse movement of the disc, (that is, in a counter-clockwise direction, viewing Figure 1) will cause all the levers D to be thrown into the position in which one of the said levers is indicated in dot-and-dash lines in Figure 1, the grousers being therefore withdrawn within the periphery of the wheel. It is immaterial whether the disc B is arranged to overrun the wheel or to lag behind it to effect the automatic protrusion of the grousers. When travelling on a hard surface, such as that of a good road, the action of the springs F tending to cause protrusion of the grousers is resisted by the road surface, so that the points of all the grousers are kept just level with the tread of the wheel. On reaching softer ground, however, the points of the teeth are caused to enter it by the combined action of the said springs F, F, and other forces later to be described, to an extent dependent on the degree of softness of the ground and the torque upon the wheel, and within their outward limit of movement, thus not only increasing the arc of contact with the ground but also using the ground as a rack on which they can roll, the curved shape of the teeth facilitating their withdrawal as they are carried round without unnecessary digging or rut-forming in the ground.

As shown in Figure 1, when the grousers are in their normal, protruding position, the toothed portions C are substantially radially disposed with respect to the wheel A, and peripherally offset from bolts $a^1$, their pivot points. With this construction, any pivotal movement of the grousers about bolts $a^1$ causes an up-and-down, or substantially radial movement of the grouser teeth, thus providing maximum penetration causation with a minimum fore-and-aft movement. This arrangement is also conducive to maximum torque efficiency, since after initial penetration by the grousers has been effected, the torque upon the wheel is exerted through pivot bolts $a^1$ upon the grousers in a direction tangential to wheel A, and hence substantially perpendicular to the direction of pivotal movement of the grouser teeth, and therefore works against the resistance of the ground, giving the wheel a positive motion forward, and is not expended in swinging the grousers about their pivots.

It is desirable to provide means whereby the driver can either momentarily prevent the protrusion of the grousers, or lock them in the retracted position so that the vehicle can travel for a long distance while they remain inoperative, and such means are more particularly illustrated in Figures 4 and 5. A lever G pivoted on the wheel axle H at $h'$ is adapted to be operated through suitable connections (not shown) from a handle under the control of the driver. This lever is operatively connected with a ring or socket J by means of arms $g^2$ having pins $g^3$ which engage corresponding recesses $j^2$ in socket J, and a movement of the said lever in the direction of the arrow $g'$ causes the socket to move in the direction of the arrows $j$ to engage a series of rollers K mounted in jaws $m'$ on the ends of levers M secured to one end of and pivotally mounted by stub shafts $m^2$ journalled in suitable bearing bosses $a^6$ carried by wheel A secured to the other end of shafts $m^2$ are levers $m^3$ having spherical ends $m^4$ which work in slots N in the control disc. This axial outward movement of socket J and its engagement with rollers K rotate levers M in a counter-clockwise direction, as viewed in Figure 4, on their stub shafts $m^2$ thereby causing a corresponding movement of levers $m^3$. Due to the engagement of spherical ends $m^4$ and slots N in control disc B, this latter movement of levers $m^3$ in turn causes a counter-clockwise movement, as viewed in Figure 1, of disc B thereby drawing in all the grousers. When the driver releases the said handle, the springs F tend to protrude the grousers again. If, after operating the lever G, when the lug P (Figures 1, 3 and 5) on the disc B has passed the slot R in the wheel A, the driver pushes the locking handle S to the outer part of the slot R to prevent the return of the lug P, the disc B will thus be locked with all the grousers in their inoperative positions. As shown best in Figures 3 and 5, locking handle S is freely mounted upon the reduced stem $t'$ of a locking stop T which lies in the space intermediate the inner face of wheel A and the outer face of disc B and normally out of the path of lug P. Stop T is also provided with a threaded portion $t^2$ which extends through slot R and to which stem $t'$ is secured. Between the stop portion T and the threaded portion $t^2$ there is a collar $t^3$ which is wider than slot R. Threaded onto portion $t^2$ there is a nut U which bears against a washer V, also wider than slot R. The hub $s'$ of lever S supported on stem $t'$ is normally disconnected from nut U, but is provided with radial teeth or projections $s^2$ adapted to engage corresponding teeth or grooves $u'$ formed on nut U. If lever S is moved to the left, as viewed in Figure 5, so that teeth $s^2$ engage teeth $u'$, it is evident that nut U may be rotated so as to either release or clamp stop T in any desired position relative to slot R, either in or out of the path of lug P.

Each of the levers D may be provided with more than one tooth; an example of a segment with two teeth is illustrated in Figure 6. The teeth may be skewed or staggered, as shown in Fig. 9, in order to increase the width of the track in which they touch the ground, and in order that when in the collapsed position each segment can overlap the adjacent segment.

Referring now to the modus operandi of the present invention, the normal direction of rotation of wheel A is clockwise, as viewed in Figure 1, and the normal, outwardly protruding, operative position of grousers C is substantially as shown in the same view. It will thus be seen that as the wheel rotates, the forces acting upon the grousers tending to force them outward are the pressure of springs F, and centrifugal force, while positively limiting the outward movement are stops $a^5$.

Now assuming that line $x$—$x$ represents the surface of the ground upon which wheel A is rolling, when the tip $c^1$ of a grouser C initially strikes the ground, a component of the axle weight of the wheel and vehicle acts upon tip $c^1$, and is opposed by the reaction of the ground. This latter opposing force is dependent upon the hardness of the ground, and normally acts to overcome the outward pressure of spring F and centrifugal force tending to cause penetration, and to force the grouser inward.

However, by the construction herein disclosed, it is possible to utilize this component of weight to momentarily augment and supplement, instead of to oppose, the spring pressure and centrifugal force, and thus achieve penetration on relatively hard ground. This important, beneficial result is attained by so constructing the wheel A and grousers C that, at the instant of initial contact between tip $c^1$ of the grouser and the ground, the fixed pivot point $a^1$ is behind (as respects direction of motion of the vehicle) the point of contact between tip $c^1$ and the ground. In other words, this condition exists when a line $y$—$y$ drawn from the center of pivot $a^1$ perpendicular to the ground line, represented by line $x$—$x$, intersects said ground line behind, or to the left as viewed in Figure 1, of the point of contact between tip $c^1$ and the ground line.

Under these circumstances, the resistance of the ground to penetration, which may be represented in a force diagram (Figure 7) by a vertical, upward directing force vector $or$, creates a turning moment about pivot $a^1$ tending to move tip $c^1$ counterclockwise, or further outward from wheel A. This movement is positively prevented by stop $a^5$ with the consequence that vector $or$ is opposed by an equal and opposite vector $or^1$, leaving an unbalanced force $ow$, due to the component of the weight of the wheel and vehicle, plus spring pressure and centrifugal force, acting on tip $c^1$ to cause initial penetration by the grouser.

The additional force thus obtained tending to cause initial penetration of the grousers, diminishes rapidly, however, as forward motion of the vehicle continues and when line $y$—$y$ passes forward of the point of contact between tip $c^1$ and the ground, the effect of the ground resistance is reversed and thenceforth tends to cause retraction of the grouser. However, once initial penetration has been effected, another force, that of the torque upon the wheel, becomes active in tending to cause deeper penetration of the grouser. The forces then acting, as shown in Figure 8, are $or$, resistance of the ground which is now no longer opposed by $or^1$, $ow$, and $ot$, a portion of the torque upon the wheel, the vertical resultant of which forces, $os$, causes further penetration by the grouser.

There is thus established what may be termed a condition of automatic torque penetration by the grousers, since with the weight of the wheel and vehicle constant, grouser penetration is automatically adjusted or regulated to the condition of the soil, depending as to its degree of effectiveness (distance or depth of penetration) upon the power of the engine of the vehicle at a given road speed, i. e., torque upon the wheel. From the above it will be seen that the effect of the axle weight of the vehicle in aiding initial penetration may be varied by altering the relative positions of pivot $a^1$ and tip $c^1$ of the grouser, the greater the distance between pivot $a^1$ and a line drawn from the center of wheel A to tip $c^1$ of the grouser, the less the effect of the weight in aiding penetration.

What I claim and desire to secure by Letters Patent of the United States is:—

1. In a road vehicle wheel, a rim having an extension alongside the tread, a control disc angularly movable co-axially with the wheel, a plurality of toothed grousers each comprising a rigid lever pivotally connected with said extension and operatively connected with the control disc, projections on the control disc, the wheel being provided with slots in which said projections are movable, and springs secured to the wheel and adapted to impel said projections in said slots to rock the control disc, whereby the grousers are rocked relatively to the wheel rim extension to protrude their teeth beyond the tread of the wheel.

2. In a road vehicle wheel, a rim having an extension alongside the tread, a control disc angularly movable co-axially with the wheel, a plurality of toothed grousers each pivoted to said extension, each of said grousers having a slotted cranked arm, pins on the control disc movable in the slots of said cranked arms, projections on the control disc, the wheel having slots receiving said projections, and springs secured to the wheel and adapted to impel said projections in said slots in the wheel to rock the control disc, whereby the grousers are rocked relatively to the wheel rim extension to protrude their teeth beyond the tread of the wheel.

3. In a road vehicle wheel, a rim having an extension alongside the tread, a control disc angularly movable co-axially with the wheel, a plurality of toothed grousers each comprising a plurality of teeth in staggered arrangement and an integral rigid lever pivotally connected with said extension and operatively connected with the control disc, projections on said control disc, the wheel having slots receiving said projections, and springs secured to the wheel and adapted to impel said projections in said slots to rock the control disc, whereby the grousers are rocked relatively to the wheel rim extension to protrude their teeth beyond the tread of the wheel.

4. In a road vehicle wheel, a plurality of toothed grousers pivotally mounted on said wheel, a control disc carried by but angularly movable relative to said wheel and having operative connections with said grousers, a spring acting to impel the disc to rock in one direction and cause the teeth of the grousers to protrude beyond the periphery of the wheel, a lever movable relative to but having operative engagement with the control disc and adapted to rock said control disc in the reverse direction to retract said teeth independently of the motion of the wheel, and means for actuating said lever.

5. In a road vehicle wheel, a plurality of toothed grousers pivotally mounted on said wheel, a control disc carried by but angularly movable relative to said wheel and having operative connections with said grousers, a spring acting to impel the disc to rock in one direction to cause the teeth of the grousers to protrude beyond the periphery of the wheel, the control disc having a slot formed therein, a lever movable in said slot in the control disc and adapted to rock the disc in the reverse direction to retract the grouser teeth, and means to actuate said lever comprising an axially movable socket adapted to be reciprocated by a lever under the control of the driver while the vehicle is travelling.

6. In a vehicle wheel, a rim, a plurality of grousers having toothed tips adapted to protrude beyond the rim and to penetrate the ground, pivots for said grousers secured to the rim, resilient means for normally urging said grousers to an outwardly protruding, operative position, and a plurality of stops for positively limiting the extent of said outward movement, said pivots and stops being so located with respect to said tips that at the instant of initial contact between a grouser tip and the ground the axle weight of the wheel and vehicle is effective to augment the pressure of said resilient means for causing penetration of the ground by the grouser tip.

7. A vehicle wheel including a rim, a plurality of toothed grousers pivotally mounted on said rim, and adapted to penetrate the ground, resilient means for normally urging said grousers to protrude outwardly beyond said rim into operative position, and means for rendering the axle weight of the wheel and vehicle effective to augment the pressure of said resilient means at the instant of initial contact between a grouser and the ground for causing penetration of the ground by the grouser.

8. In a vehicle wheel, a rim, a plurality of grousers having toothed tips adapted to protrude beyond the rim and to penetrate the ground, pivots for said grousers secured to the rim, levers connecting the pivots and toothed tips of said grousers, resilient means for normally urging said grousers to an outwardly protruding, operative position, and a plurality of stops for positively limiting the extent of said outward movement, said pivots and stops being so located with respect to said tips and said levers being so constructed and arranged that the amount of penetration of the ground by the grousers is automatically adjusted dependent upon the resistance of the ground and the torque upon the wheel.

NICHOLAS STRAUSSLER.